United States Patent [19]

White et al.

[11] Patent Number: 4,476,018

[45] Date of Patent: Oct. 9, 1984

[54] FIELD ASSEMBLED CLARIFIER

[75] Inventors: Harold R. White, New Lenox; Alex J. Doncer, Jr., Palos Heights, both of Ill.

[73] Assignee: Alar Engineering Corporation, Mokena, Ill.

[21] Appl. No.: 475,190

[22] Filed: Mar. 14, 1983

[51] Int. Cl.³ .............................................. B01D 21/10
[52] U.S. Cl. ................................... 210/232; 210/525; 210/527
[58] Field of Search ............... 210/232, 237, 241, 513, 210/527, 238; 29/426.5

[56] References Cited

U.S. PATENT DOCUMENTS

| | | | |
|---|---|---|---|
| 4,056,477 | 1/1983 | Ravitts | 210/237 |
| 4,193,871 | 3/1980 | White et al. | 210/142 |
| 4,257,900 | 3/1981 | White et al. | 210/776 |
| 4,346,005 | 8/1982 | Zimmerman | 210/232 |

OTHER PUBLICATIONS

Homer W. Parker, Wastewater Systems Engineering, 1975, pp. 206-207, Prentice-Hall, Inc., Englewood Cliffs, N.J.

Primary Examiner—Ernest G. Therkorn
Assistant Examiner—John Donofrio
Attorney, Agent, or Firm—Hill, Van Santen, Steadman & Simpson

[57] ABSTRACT

Large settling tanks or clarifiers of the travelling bridge type are provided in easily assembled small component sections fitting a conventional size flat bed truck for shipment to a use site to be assembled on a concrete basin requiring only a lifting crane and a small assembly crew. The knocked down clarifier eliminates heretofore required on-site time consuming building by skilled personnel and makes possible factory prefabrication of all of the clarifier parts with the exception of the concrete basin.

6 Claims, 8 Drawing Figures

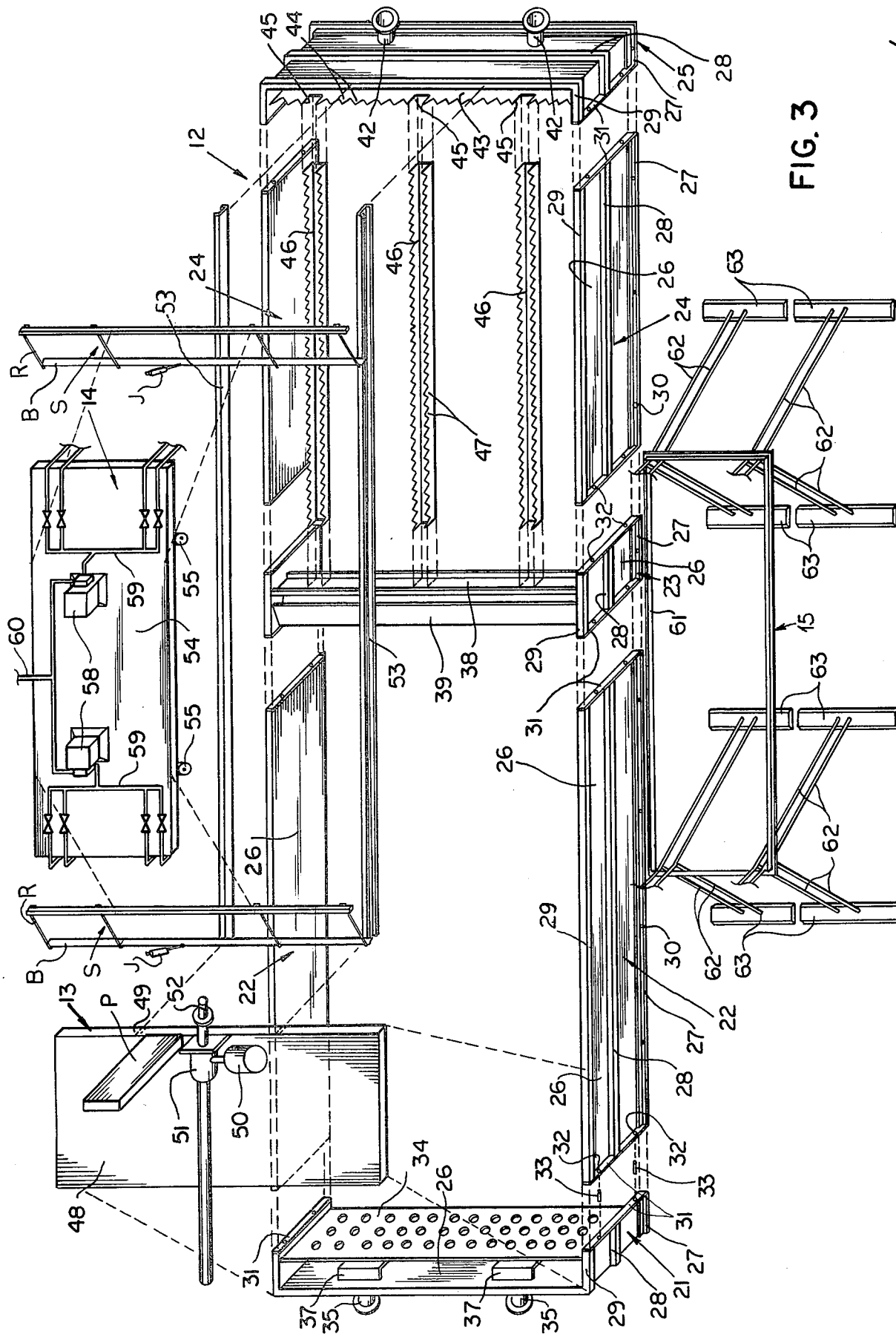

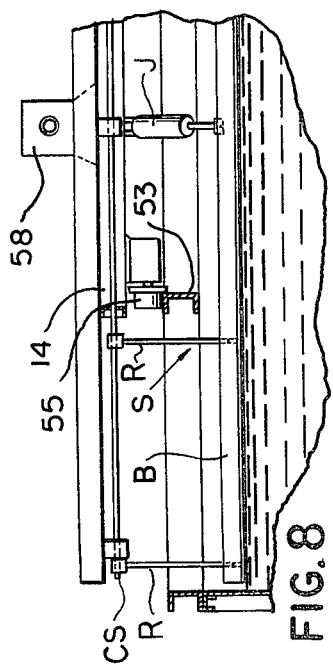
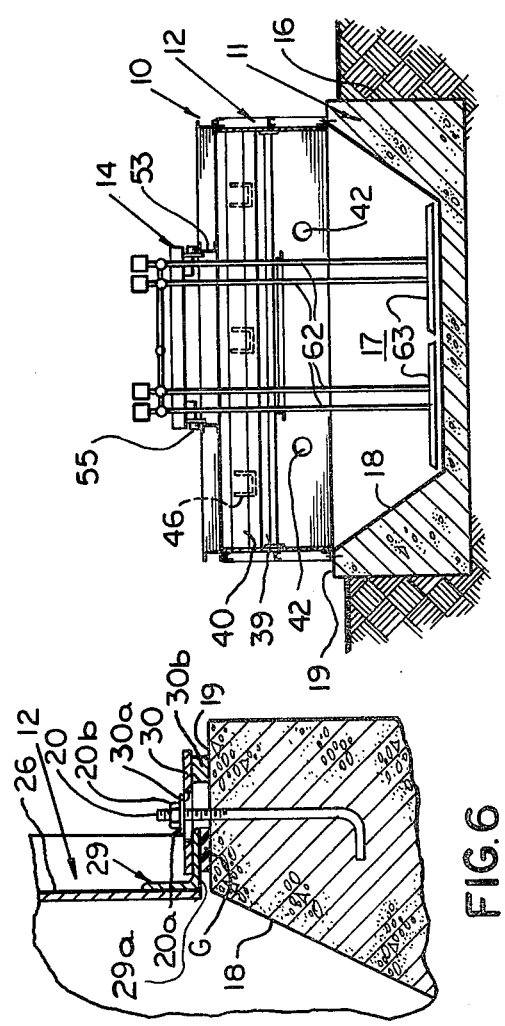
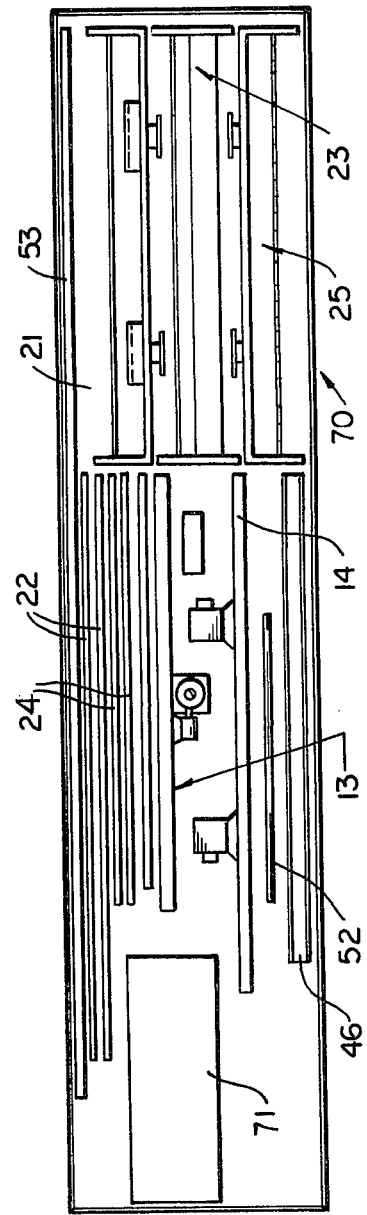
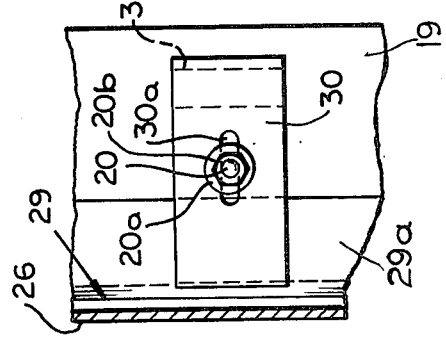

FIELD ASSEMBLED CLARIFIER

BACKGROUND OF THE INVENTION

1. Field of the Invention

This invention relates to the art of manufacturing clarifiers or settling tanks and particularly deals with travelling bridge clarifiers easily and quickly assembled at the use site on a concrete basin from pre-fabricated components and sub-assemblies forming compact bundles fitting on a conventional size truck for over the road shipment to the use site.

2. Prior Art

Travelling bridge clarifiers or settling tanks are generally too large to be shipped in assembled form and have been erected at the use site requiring services of skilled builders for a prolonged time period frequently under unsatisfactory weather conditions all contributing to large expense and delays. Travelling bridge clarifiers of the type disclosed and claimed in our U.S. Pat. No. 4,193,871 issued Mar. 18, 1980 may be 15 to 25 feet in width, 40 to 75 feet in length, and 6 to 10 feet in depth, thus preventing over the road shipment of complete assembled units. Further the metal tank of the clarifier required heavy steel sheets and beams adding to shipment costs and installation problems.

It would, therefore, be an improvement in the art to produce clarifiers with concrete basins which are poured at the use site and pre-fabricated sub-assemblies and interfitting components small enough to be compactly packed and shipped on a conventional size flat bed truck and then easily and quickly assembled on top of the concrete basin.

SUMMARY OF THE INVENTION

According to this invention, a travelling bridge clarifier is constructed from easily shipped compact factory built sub-assemblies and components for assembly on a concrete basin that has been poured at the use site. An excavation of desired size and shape is dug in the ground and the concrete basin is poured under conventional procedures used in forming swimming pools. The basin is generally rectangular having a flat peripheral rim or top edge in which upright construction bolts are anchored. The clarifier is shipped "knocked down" on a flat bed trailer for easy unloading by a crane or fork lift and component parts are successively positioned and assembled on the top edge or rim of the basin, secured by the anchor bolts and forming a baffled inlet, overflow weirs, an outlet, tracks for the bridge and a service platform. A pick up or suction head frame is suspended from the bridge to ride over the bottom of the basin.

It is then an object of this invention to provide a travelling bridge clarifier of the type disclosed and claimed in U.S. Pat. No. 4,193,871 in a knocked down condition for assembly at the use site.

Another object of this invention is to provide a settling tank having a poured concrete basin, and prefabricated sub-assemblies mounted on the basin constructed and arranged to remove sludge from the bottom of the basin and overflow clarified liquid above the basin.

A specific object of this invention is to provide a field assembled travelling bridge clarifier composed of factory built sub-assemblies and components which are compactly packed for shipment and erected on a concrete basin.

Another specific object of this invention is to provide a travelling bridge clarifier erected at the use site from interfitting pre-fabricated sub-assemblies.

Other and further objects of this invention will become apparent to those skilled in this art from the following detailed description of the annexed sheets of drawings in which:

BRIEF DESCRIPTION OF THE DRAWINGS

FIG. 3 is an exploded perspective view illustrating the clarifier sub-assemblies with dotted lines illustrating the relationship of the assemblies.

FIG. 4 is a transverse cross-sectional view along the line IV—IV of FIG. 1.

FIG. 5 is a plan view of a flat bed truck trailer with the sub-assemblies and components of the clarifier compactly mounted thereon for shipment.

FIG. 6 is a view similar to FIG. 4 but enlarged to show details of a preferred mounting of the tank frame on the concrete basin.

FIG. 7 is a plan view of a mounting plate shown in FIG. 6.

FIG. 8 is a fragmentary and broken transverse view showing the skimmer suspension.

BRIEF DESCRIPTION OF PREFERRED EMBODIMENTS

Figure 1:
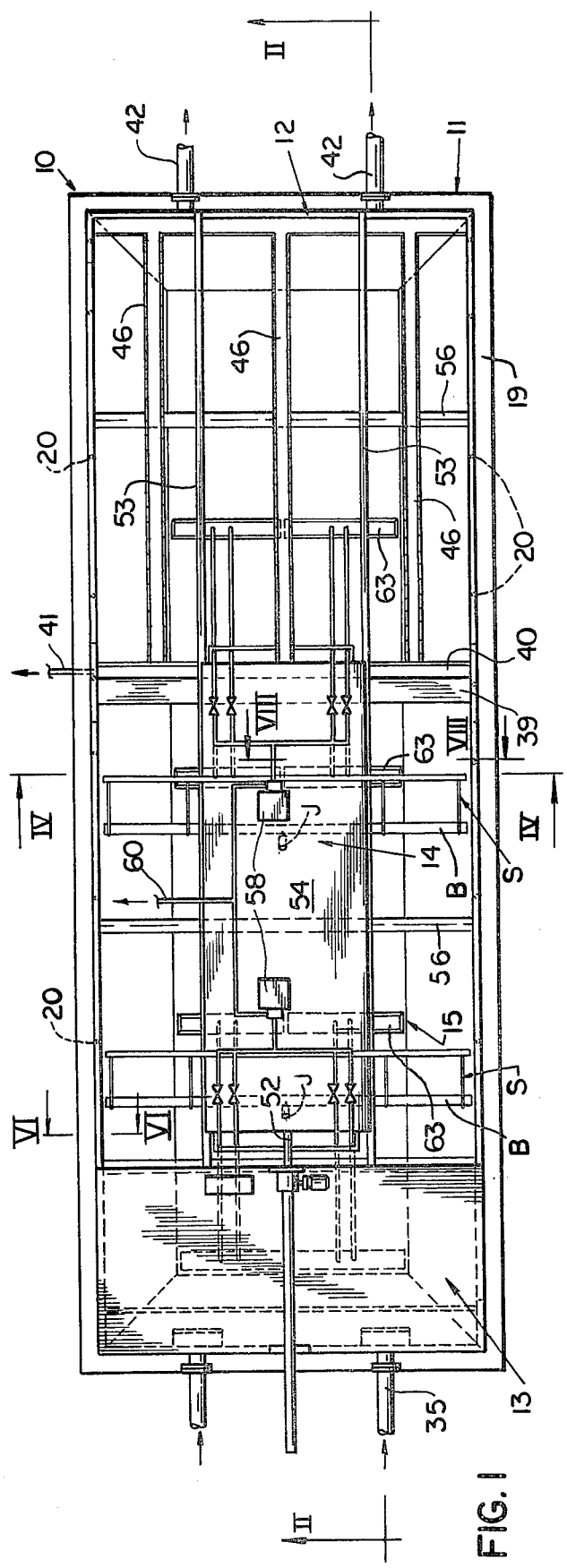
FIG. 1 is a plan view of a travelling bridge clarifier of this invention.

The clarifier 10 of this invention includes a concrete basin 11, a sidewall tank frame 12 mounted on the basin, a service platform 13 mounted on one end of the frame, a travelling bridge 14 riding on top of the frame, and a suction head frame 15 suspended from the travelling bridge 14.

In accordance with this invention, the concrete basin 11 is poured in an excavation 16 at the use site to provide a sump 17 with sloping sidewalls 18 and a flat peripheral rim or top edge 19. Bolts 20 (best shown in FIG. 6) are anchored upright in this top edge 19 at spaced intervals of about 12 inches around the periphery of the concrete basin to secure the frame 12 on top of the basin.

As best shown in FIG. 3, the sidewall tank frame 12 is composed of an inlet end section 21, a pair of elongated sidewall sections 22, a central oil overflow section 23, a second pair of sidewall sections 24, and an outlet end section 25 all arranged for mounting on the top edge 19 of the basin and for successive bolting together to form the unitary sidewall frame providing a leak proof tank extension of the sump 17.

The sidewalls of the component sub-assemblies 21-25 are formed from heavy steel sheets 26, preferably about one-quarter inch thick, and structurally reinforced on their outer faces by welded-on channel or angle beams including a bottom beam 27, a central beam 28 and a top beam 29. The bottom beam 29 as shown in FIG. 6 is an angle beam with an outturned horizontal leg 29a resting on a gasket G which is placed around the rim edge 19 of the concrete basin 11. Steel plates 30 are provided for each bolt 20 and have a slot 30a receiving the bolt. The plates 30 are rigid rectangles about 4 inches wide, eight inches long with the slot being about 1½ inches long. The inner ends of the plates overlie the leg 29a while the outer ends overlie bars 30b which may be welded thereto. The bar has a height about the same as the stacked height of the gasket G and leg 29a.

The bolts 20 project freely through the slots 30a of the plates 30, receive washers 20a bottomed on the plates 30 and nuts 20b threaded thereon cause the plates to clamp the leg 29a and the gasket G into sealed relation with the rim 19 of the basin 11. The gasket G is preferably a 35–45 durometer neoprene rubber.

The end edges of the components or sub-assemblies have end face plates or strips 31 welded thereon with holes 32 therethrough to receive bolts 33 to secure the plates 31 in abutting relation with sealant or gaskets (not shown) interposed therebetween if desired.

The inlet section 21 has the end steel sheet 26 extending completely across the width of the frame with short sidewall sheets at both ends thereof extending to the face plates 31. A perforated baffle plate 34 spans the space between these short end sheets just behind the face plates 31 and is welded to the sheets. Inlet pipe couplings 35 project outwardly from the end sheet 26 and hoods or deflector baffles 37 are welded to the inner face of the end sheet 26 over the entrance openings from the inlets 35.

Figure 2:
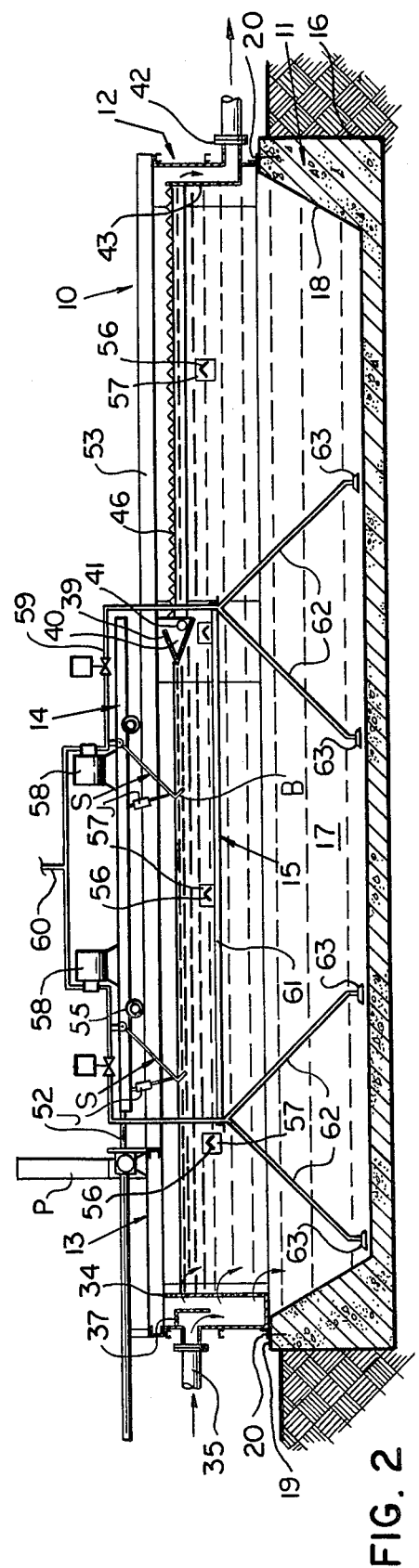
FIG. 2 is a longitudinal cross-sectional view along the line II—II of FIG. 1.

The central section 23 has a cross beam 38 and a steel sheet 39 paralleling the beam and cooperating therewith, as shown in FIG. 2 forming a trough or oil sump 40 with a lip edge to receive oil and floating scum on top of a pond of liquid being clarified in the tank. Skimmers, hereinafter described, push the scum to the trough or sump. A side outlet 41 drains the trough 40.

The outlet section 25 has two outlet pipe couplings 42 receiving overflow liquid behind a baffle 43 which, like the baffle 34 spans the side plates 26 of the end section 25. The top of this baffle 43 is serrated or toothed at 44 and has three recesses 45 receiving the ends of U-shaped longitudinal weir beams 46 also provided with toothed top edges 47. The front ends of these weirs 46 are supported on the cross beam 38 of the section 23.

The service section 13 has a rectangular steel plate 48 with depending peripheral reinforcing side beams 49 spanning the inlet end of the frame 12 and secured thereto. This platform 13 mounts an electric motor 50 driving a ball nut actuator 51 which reciprocates an elongated screw rod 52 to drive the bridge 41. An upright control panel P is also mounted on the platform 13.

Rails 53 are mounted on top of the frame 12 to support the bridge 14.

The bridge 14 has a rectangular base 54 with flanged wheels 55 riding the tracks 53. As shown in FIG. 1 the base 54 is narrower than the width of the frame 12 and the tracks are thus inwardly from the sides of the frame. Cross beams 56 are provided at intervals to reinforce the frame and to also support the tracks. These beams have end plates 57 (FIG. 2) which are bolted to the sidewalls of the sections 22 and 24.

The bridge base platform 54 mounts a pair of electric motor driven or pneumatically operated suction pumps 58 and valved inlet piping 59 to the pumps with a flexible hose outlet 60 discharging from the pumps over the side of the frame 12.

Skimmers S shown in FIG. 2 are pivotally suspended from the bridge 14 at spaced intervals to operate ahead of the trough or sump 40. These skimmers S have plastic wiper blades B (FIGS. 3 & 8) extending across the width of the tank frame 12 mounted on the ends of rods swingably suspended from the bridge frame or base 54 and raised and lowered by pneumatic jacks J also suspended from the bridge. On the forward (left to right) stroke of the bridge the blades B are lowered into the oil or scum floating on the liquid in the tank to drag it toward the trough 40 causing it to build up and overflow into the trough. On the reverse (right to left) stroke of the bridge the blades are raised above the oil or skum level.

As shown in FIG. 8, the wiper blade B is mounted on the ends of a plurality of rods R on a rotatable cross shaft CS suspended from the bridge 14.

As shown in FIG. 3, the inlet piping 59 suspends an open rectangular frame 61 from which pipes 62 suspend suction heads 63. Four pairs of such heads are provided with the heads of each pair in end to end relation and with the pairs spaced longitudinally to span the bottom of the basin 11 and traverse a quadrant of the bottom as the bridge is reciprocated. Control valves are operated in sequence to connect the suction pumps to the suction heads as more fully described and illustrated in our aforesaid U.S. Pat. No. 4,193,871.

The control panel P on the service platform 48 of the section 13 has relays and switches to control and monitor the operation of the drive motor 50, the suction pumps 58, the skimmers S, and the valves in the pipe lines 59. Pipe couplings of course are provided to connect the pipe sections.

When the rame or tank sections are bolted together and the frame 12 is bolted on the top of the concrete basin, the interior of the tank forming frame may be coated with an epoxy sealant. Preferably, however, the coating is applied in the shop under controlled conditions and the precoated sections are then assembled in the field without requiring a field applied coating.

The clarifier operates in the same manner as described in our aforesaid patent, receiving solids contaminated liquid through the inlet couplings 35, discharging into the chamber behind the perforated baffle plate 34 and flowing into the tank for settling of the sludge into the bottom of the basin with the floating oil or scum being pulled by the skimmers S and overflowing into the trough 40 and the clarified liquid overflowing into the weirs to the outlet couplings 42. The sludge at the bottom of the basin is sucked out through the heads 63 and discharged at 60.

As shown in FIG. 5 the sub-assemblies and components for mounting on the concrete basin are easily bundled and mounted on a flat bed truck trailer 70. As there shown the inlet section 21, the mid oil collecting section 23 and the outlet section section 25 are positioned in side-by-side longitudinally extending relation on the truck bed. The bridge rails 53 can rest lengthwise along one side edge of the truck bed with the long sidewall sections 22 and the short sidewall sections 24 resting lengthwise behind the inlet section 21 in side-by-side relation. The service platform 13 and the bridge section 14 can be positioned at the longitudinal center of the truck bed behind the outlet section 23. The drive screw 52 can then easily fit on the other side of the bridge section 14 with the longitudinal weirs 46 stacked together alongside the drive screw. Pick up headers 63, suction pipes 62, bolts 20 and 30, and the like components can be bundled together in a package 71 mounted on the rear end of the truck bed 70.

All of the components and their bundles are easily removed from the truck bed 70 by a lifting crane or a lift fork and moved into position for bolting onto the top edge 19 of the concrete basin 11.

From the above descriptions, it will therefore be clear to those skilled in this art that provision of an on-site poured concrete basin to form the sump of a travelling bridge clarifier and the provision of prefabricated easily shipped and easily bolted together sub-assemblies and components greatly simplifies and reduces the cost of clarifiers without in any way affecting the operating efficiency of clarifiers that heretofore had to be completely erected at the use site.

While various changes and modifications might be proposed by those skilled in the art, it will be understood that we wish to include within the claims of the patent warranted hereon all such changes and modifications as reasonably come within our contribution to the art.

We claim as our invention:

1. A knocked-down clarifier composed of sub-assemblies and components sized and shaped to be transportable on a conventional over the road truck for assembly on top of a peripherally rimmed concrete basin at the use site which comprises a tank extension frame composed of an inlet end section, an intermediate oil collection section, an outlet end section, sidewall sections joining the inlet section to the intermediate section and the intermediate section to the outlet end section, end plates on said sections positioned to be interfaced and bolted together to form an upstanding open top and open bottom peripheral frame sized to rest on the peripheral rim of the basin to extend the height and increase the volume of the basin, fasteners securing the bolted together peripheral frame to said rim, cross beams joining the sidewalls at spaced intervals, a transverse channel beam on said intermediate section, a transverse overflow trough on said intermediate section, in front of said channel beam individual transversely spaced longitudinal weirs having rear ends detachably mounted on the top of said outlet end section behind said trough, and front ends supported on said channel beam, longitudinal tracks on said frame, a bridge riding on said tracks, a service platform mounted on said frame, power means on said platform reciprocating said bridge on said tracks, suction pumps with inlets on said bridge, piping connected to said inlets depending from said bridge, and suction heads coupled to and suspended from said piping to ride over the bottom of the basin.

2. The clarifier of claim 1 wherein the weirs are channel beams with toothed side legs.

3. The clarifier of claim 1 wherein the inlet end section includes a transverse baffle spanning the tank frame.

4. The clarifier of claim 1 wherein oil skimmers are swingably suspended from the bridge to be lowered into the tank frame as the bridge advances toward the trough and raised as the bridge retracts away from the trough.

5. A field assembly travelling bridge clarifier for mounting on a concrete basin which comprises a plurality of factory pre-fabricated metal sub-assemblies having end faces, bolts uniting said end faces to form an open top and open bottom longitudinally elongated upright peripheral tank extension, fasteners securing said tank extension on top of said basin, said tank extension increasing the height and volume of the basin, tracks mounted on said tank extension along the length thereof, a factory prefabricated bridge assembly having wheels riding on said tracks, pump means on said bridge assembly, pipes extending from said pump means, a factory pre-fabricated service assembly mounted on said tank extension, a suction header assembly having a rectangular frame suspended from said bridge assembly, a plurality of pairs of side-by-side headers suspended from said rectangular frame in longitudinally spaced relation connected to and discharging through said pipes, individual longitudinally extending overflow weirs at the top of said tank extension in spaced side-by-side relation, a transverse trough assembly mounted on said tank extension ahead of said weirs, a cross beam on said tank extension behind said trough supporting the front ends of said weirs, a transverse overflow baffle on said tank extension supporting the rear ends of said weirs, skimmers on said bridge assembly adapted to pull scum floating on liquid in the tank extension to said trough, and all of said assemblies, pipes and weirs, sized for fitting an over the road vehicle for transportation to said basin.

6. The clarifier of claim 5 including an intermediate tank extension sub-assembly having a transverse trough ahead of the weirs and skimmers on the bridge pulling scum to the trough.

* * * * *